F. W. ERICKSON.
OUTLET BUSHING.
APPLICATION FILED OCT. 5, 1911.
1,030,293.
Patented June 25, 1912.
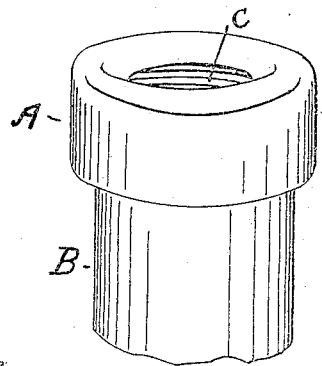
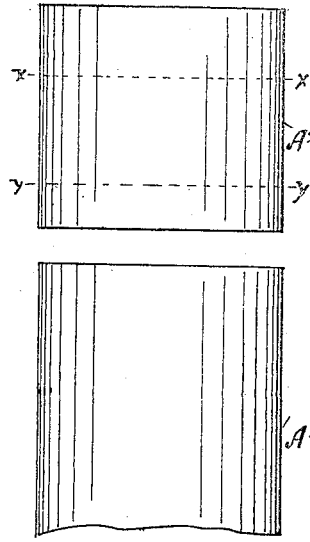
Attest,
John Martin.
L. A. Hill.
Inventor,
Frederic Wm Erickson
Jno Willis Pierce
Attorney.

UNITED STATES PATENT OFFICE.

FREDERIC WM. ERICKSON, OF NEW YORK, N. Y.

OUTLET-BUSHING.

1,030,293.　　　Specification of Letters Patent.　　Patented June 25, 1912.

Application filed October 5, 1911.　Serial No. 652,942.

*To all whom it may concern:*

Be it known that I, FREDERIC WM. ERICKSON, residing at New York, in the county of New York and State of New York, have invented certain Improvements in Outlet-Bushings, of which the following is a specification.

The present invention relates to a new form of outlet bushings for the terminals of interior conduits, which can be manufactured at a low cost, both on account of the material used in its manufacture and the machinery to effect the results.

The common outlet bushings are made in a variety of ways, but all of them that I am aware of have an internal screw thread made in them by means of taps or suitable machinery which tends to raise the cost of the bushing; and when the bushing is stamped up from sheet metal there is a waste of the same by reason of the blank cut from the central portion.

In forming an outlet bushing by my invention, I prefer to use a tubular rod of the right diameter, from which suitable lengths are cut; and in the completed bushing the ends of a length thus cut off are upset and bent inward to form abutments inclosing a section of a compressed spring of suitable cross-section to constitute an internal screw thread. All of which I will now proceed to describe in detail and point out in the appended claim, reference being had to the accompanying drawings which form a part of the specification and illustrate the invention.

In the drawings, Figure 1 is a perspective view of my improved outlet bushing on the end of a conduit or pipe. Fig. 2 is a sectional view of the outlet bushing. Fig. 3 is a side view of the spring which is adapted to constitute an internal screw thread detached from its shell and therefore expanded. Fig. 4 is the threaded end of an iron conduit or pipe. Fig. 5 is a side view of a cylindrical pipe or rod. Fig. 6 is a section of the aforesaid pipe severed therefrom; and Fig. 7 shows the cross-section of rods or wires which may be used for such springs as represented by Fig. 3.

In the figures, A represents the outlet bushing adapted to be screwed onto the end of the pipe B, and is composed of the shell $a$, the upper end or edge 1 of which is rolled over and inward to nearly form a resilient ring, while the opposite or lower edge or end is upset and turned inward at right angles to the outer side, to form a solid abutment 2.

Between the inner faces of the upper and lower ends 1 and 2 is a section of a spring C which is held in a compressed state by said ends which thus constitute abutments therefor. The spring C is represented as being diamond shape in cross-section 4 but may be of any suitable section as shown by $4^a$, $4^b$ and $4^c$ in Fig. 7.

I prefer to make the shell $a$ from a cylindrical pipe or rod $A^3$ by cutting off therefrom suitable lengths $A^2$ and forming the roll 1 on one end which shortens the said length to dotted line $x, x$, and then inserting into the shell a suitable length of spring C, after which the opposite end of the shell is bent over and inward to the dotted line $y, y$, to form the lower edge or abutment 2, and thus the spring is held between the abutments 1 and 2 firmly but not too rigidly as the coils or turns of the spring and the roll 1 will be found to possess resiliency. It will be understood that the outer roll 1 constitutes the terminal and is adapted in shape to protect the insulation of conductors. I make the coils of the spring C of such cross-section and of such an internal diameter that when a pipe of suitable diameter and thread is inserted therein the thread thereof will enter the inwardly expanding spaces 3 formed by the internal sides of said coils, precisely as if the spring was an internally threaded nut.

I find that in practice this spring nut has advantages over a solid tapped nut as by its resiliency it constitutes a locking medium to grip the pipe thread after the bushing is fully attached to the pipe end as there is a tendency to tighten up on the convolutions or coils of the spring.

The roll 1 of itself acts as a cushion by its resiliency for the spring C, and as the latter is also resilient, the two together enable the use of a cheap coarsely made thread upon the pipe B, and also allow for considerable back lash of the thread.

The opposite ends of the shell are turned over respectively in a die press which is so adjusted that only the required portion of metal is disturbed and thus the bushings are all made exactly the same size and configuration.

It will be readily understood that a long spring is made in any well known manner, and such lengths are cut off as are required for insertion in the shell.

By the means described I provide an outlet bushing cheaply and one that serves the purposes in a most effective manner.

I claim as my invention:—

An outlet bushing comprising a cylindrical shell having one end turned inwardly at a substantial right angle and the other end rolled inwardly to form a resilient abutment, and a resilient coil confined between said ends and held under compression thereby, the inner surfaces of the coil being formed to present a screw thread.

In testimony whereof, I have signed my name to this specification in the presence of two subscribing witnesses, this 3rd day of October 1911.

FREDERIC WM. ERICKSON.

Witnesses:
JOHN A. EKE,
HARRIET LEVI.